(12) United States Patent
Bharali et al.

(10) Patent No.: US 9,503,424 B2
(45) Date of Patent: *Nov. 22, 2016

(54) DYNAMIC RESOLUTION OF FULLY QUALIFIED DOMAIN NAME (FQDN) ADDRESS OBJECTS IN POLICY DEFINITIONS

(71) Applicant: Palo Alto Networks, Inc., Santa Clara, CA (US)

(72) Inventors: Anupam Bharali, San Jose, CA (US); Ajay Ghatge, Sunnyvale, CA (US); Ravi Ithal, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/807,763

(22) Filed: Jul. 23, 2015

(65) Prior Publication Data

US 2016/0014082 A1    Jan. 14, 2016

Related U.S. Application Data

(63) Continuation of application No. 14/087,961, filed on Nov. 22, 2013, now Pat. No. 9,124,627, which is a continuation of application No. 13/115,894, filed on May 25, 2011, now Pat. No. 8,621,556.

(51) Int. Cl.
*H04L 29/06* (2006.01)
*H04L 29/12* (2006.01)
*H04L 12/841* (2013.01)

(52) U.S. Cl.
CPC ......... *H04L 63/0236* (2013.01); *H04L 47/286* (2013.01); *H04L 61/1511* (2013.01); *H04L 63/02* (2013.01); *H04L 63/0227* (2013.01); *H04L 63/1416* (2013.01); *H04L 63/20* (2013.01)

(58) Field of Classification Search
None
See application file for complete search history.

(56) References Cited

U.S. PATENT DOCUMENTS 5,950,195 A * 9/1999 Stockwell ............... H04L 63/02
8,122,493 B2 * 2/2012 Drako ..................... G06F 15/16
713/154

(Continued)

*Primary Examiner* — Hadi Armouche
*Assistant Examiner* — Malcolm Cribbs
(74) *Attorney, Agent, or Firm* — Van Pelt, Yi & James LLP

(57) ABSTRACT

Dynamic resolution of Fully Qualified Domain Name (FQDN) address objects in policy definitions is provided. In some embodiments, dynamic resolution of Fully Qualified Domain Name (FQDN) address objects in policy definitions includes receiving a network policy that includes a domain name (e.g., the network policy can include a network security rule that is based on the domain name); and periodically updating Internet Protocol (IP) address information associated with the domain name by performing a Domain Name Server (DNS) query. In some embodiments, dynamic resolution of Fully Qualified Domain Name (FQDN) address objects in policy definitions includes dynamically performing a first local Domain Name Server (DNS) lookup for a first VSYS using a first DNS server on a first domain name for implementing a network policy based on the first domain name; dynamically performing a second local DNS lookup for a second VSYS using a second DNS server on the first domain name for implementing the network policy based on the first domain name; in which the network policy includes a network security rule that is based on the first domain name, and the network policy includes a network security rule that is based on the second domain name.

31 Claims, 10 Drawing Sheets

(56) References Cited

U.S. PATENT DOCUMENTS

| | | | | |
|---|---|---|---|---|
| 2003/0131245 A1* | 7/2003 | Linderman | H04L 63/0218 | 713/176 |
| 2006/0101113 A1* | 5/2006 | Lemson | G06Q 10/107 | 709/203 |
| 2007/0101437 A1* | 5/2007 | Yamamoto | G06F 17/30011 | 726/27 |
| 2007/0260649 A1* | 11/2007 | Chakra | H04L 63/10 | |
| 2008/0052758 A1* | 2/2008 | Byrnes | H04L 63/0263 | 726/1 |
| 2008/0159312 A1* | 7/2008 | Tuononen | H04L 29/12367 | 370/401 |
| 2008/0184357 A1* | 7/2008 | Drako | G06F 15/16 | 726/11 |
| 2009/0007241 A1* | 1/2009 | Tewari | H04L 12/14 | 726/4 |
| 2009/0037976 A1* | 2/2009 | Teo | G06F 21/566 | 726/1 |
| 2010/0138910 A1* | 6/2010 | Aldor | H04L 63/0236 | 726/14 |
| 2010/0274970 A1* | 10/2010 | Treuhaft | H04L 29/12066 | 711/118 |
| 2011/0072262 A1* | 3/2011 | Amir | G06F 21/52 | 713/168 |
| 2011/0116382 A1* | 5/2011 | McCann | H04L 63/0263 | 370/241 |
| 2011/0126277 A1* | 5/2011 | McCann | H04L 63/0263 | 726/13 |
| 2011/0282997 A1* | 11/2011 | Prince | H04L 63/1458 | 709/226 |

* cited by examiner

DYNAMIC RESOLUTION OF FULLY QUALIFIED DOMAIN NAME (FQDN) ADDRESS OBJECTS IN POLICY DEFINITIONS

CROSS REFERENCE TO OTHER APPLICATIONS

This application is a continuation of co-pending U.S. patent application Ser. No. 14/087,961, entitled DYNAMIC RESOLUTION OF FULLY QUALIFIED DOMAIN NAME (FQDN) ADDRESS OBJECTS IN POLICY DEFINITIONS, filed Nov. 22, 2013, which is a continuation of U.S. patent application Ser. No. 13/115,894, now U.S. Pat. No. 8,621,556, entitled DYNAMIC RESOLUTION OF FULLY QUALIFIED DOMAIN NAME (FQDN) ADDRESS OBJECTS IN POLICY DEFINITIONS, filed May 25, 2011, all of which are incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purposes devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
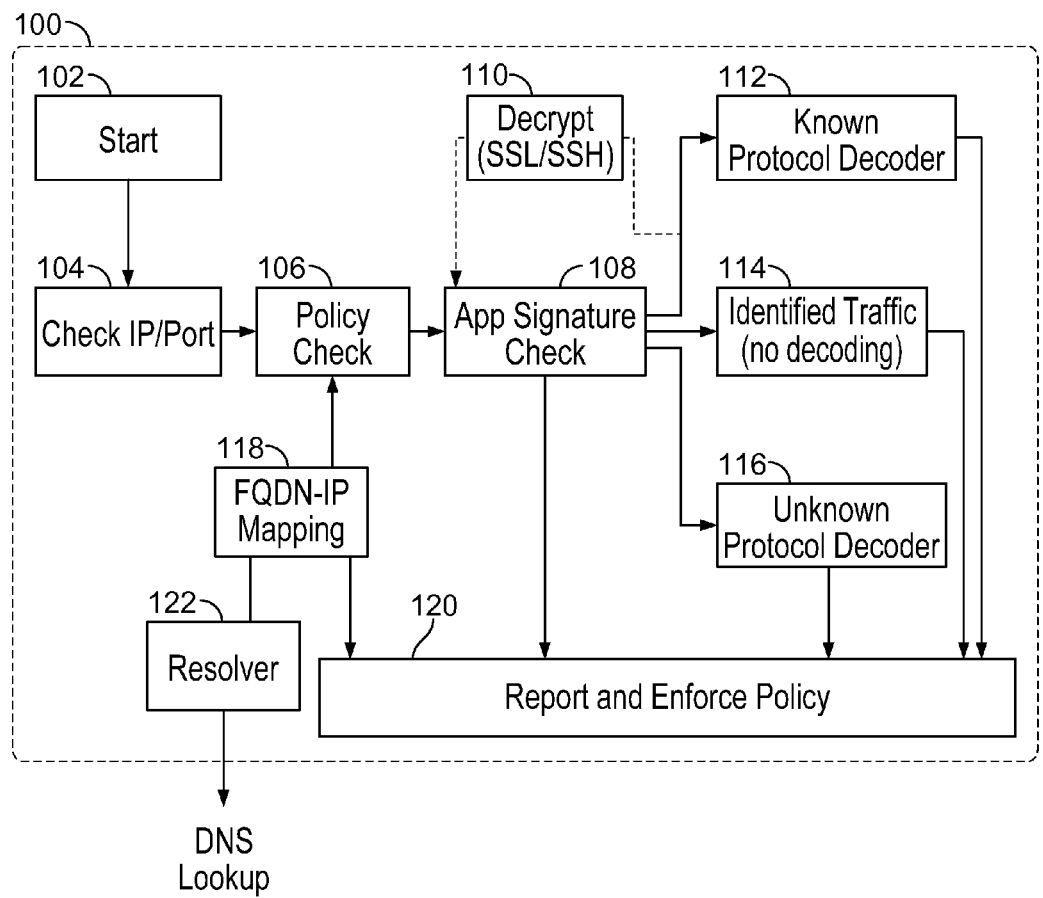
FIG. 1 is a functional diagram for dynamic resolution of FQDN address objects in policy definitions in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices, such as computer servers, gateways, network/routing devices (e.g., network routers), or data appliances (e.g., security appliances or other types of special purposes devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security appliances or gateway appliances can include security functions (e.g., firewall, anti-malware, and intrusion prevention/detection, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using Hyper Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

A network policy typically uses various combinations of source and destination addresses, subnets, and ports to apply a policy. However, there are many use cases in which, rather than using IP addresses, it is more convenient and logical for the network policy to be defined by Fully Qualified Domain Names (FQDNs) (e.g., www.yahoo.com or www.google.com). In some cases, rather than using IP addresses, it is more convenient and logical for the network policy to be defined by specific server names (e.g., MailServer), which can be resolved by a central and/or local DNS and applied to multiple devices. Specifically, each device can resolve these names to various IP addresses based on various network configurations and device deployments. For example, MailServer can resolve to different IP addresses at various remote site offices of a single enterprise. Similarly, the same policy specified by a FQDN can be applied to multiple virtual systems, and each virtual system can resolve the names to its range of IP addresses. These and other examples are discussed in greater detail below with respect to FIG. 3.

Certain network policies can include domain names. However, such network policies generally only perform the Domain Name Server (DNS) lookup to resolve the domain names when the network policy or network policy rule that includes the domain name is configured (i.e., at configuration time) and do not dynamically update the associated IP address information. However, IP addresses associated with domain names are not necessarily static and, as a result, such non-static IP addresses can change frequently and/or various domains frequently add new IP addresses, remove old IP addresses, and/or potentially use various Content Distribution Networks (CDNs) for hosting content. Also, for security policies, frequently resolving domain names can be more secure. Thus, current approaches do not provide for dynamic resolution (e.g., and thus may not have current IP address information for the domain name) for effective policy enforcement. Also, the current approaches do not address usage for virtual system (VSYS) environments.

What are needed are improved techniques for using network policies that are specified using Fully Qualified Domain Names (FQDNs), such as for network policy enforcement and/or security policy enforcement.

Accordingly, dynamic resolution of FQDN address objects in policy definitions (e.g., network policies) is provided. In some embodiments, dynamic resolution of FQDN address objects in policy definitions includes receiving a network policy that includes a domain name (e.g., the network policy can include a network security rule that is based on the domain name); and periodically updating Internet Protocol (IP) address information associated with the domain name by performing a Domain Name Server (DNS) query.

For example, using this approach that supports the use of specifying network policies based on FQDN address objects can improve the workflow for security policy management. This approach can also improve effectiveness of policy enforcement by dynamically resolving the domain names and periodically updating the resolved IP addresses to maintain freshness of the resolved IP addresses. This approach can also improve monitoring of events by providing context sensitive resolution of IP addresses to names (e.g., domain names and/or host/server names). Also, using the various techniques described herein, the resolution of the FQDN address objects need not only be performed at configuration time, and can also be performed dynamically (e.g., at enforcement time) and updated as necessary for policy enforcement. The techniques described herein can also support both Internet Protocol version 4 (IPv4) addresses and Internet Protocol version 6 (IPv6) addresses.

In some embodiments, the system includes a security appliance (e.g., the security appliance can include a firewall). In some embodiments, the IP address information includes Internet Protocol Version 4 (IPv4) information or Internet Protocol Version 6 (IPv6) information, and the domain name includes a Fully Qualified Domain Name (FQDN).

In some embodiments, the IP address information is periodically updated based on a Time To Live (TTL) value. In some embodiments, the IP address information is periodically updated based on a system frequency. In some embodiments, the IP address information is periodically updated based on a configuration setting. In some embodiments, the IP address information is periodically updated based on an event.

In some embodiments, the domain name only includes a subset of a Fully Qualified Domain Name (FQDN) (e.g., yahoo or yahoo.com, google or google.com, or facebook or facebook.com), and the policy includes a host name that is not specified as a FQDN (e.g., MailServer).

In some embodiments, dynamic resolution of FQDN address objects in policy definitions further includes executing a dynamic resolver, in which the dynamic resolver performs the periodically updating the IP address information associated with the domain name. In some embodiments, dynamic resolution of FQDN address objects in policy definitions further includes dynamically performing a resolution of the domain name (e.g., from central management) for implementing the network policy based on the domain name for enforcing the network policy based on the domain name, in which the domain name was not necessarily resolved or updated prior to enforcing the network policy.

In some embodiments, dynamic resolution of FQDN address objects in policy definitions further includes enforcing the network policy based on the IP address, in which the IP address is associated with the domain name, and the policy includes a rule or action based on the domain name. In some embodiments, dynamic resolution of FQDN address objects in policy definitions further includes monitoring events based on a context sensitive resolution of the domain name.

In some embodiments, dynamic resolution of FQDN address objects in policy definitions further includes storing the domain name, the IP address information associated with the domain name, and a Time To Live (TTL) value for the IP address information associated with the domain name (e.g., in a data store including one or more tables).

In some embodiments, dynamic resolution of FQDN address objects in policy definitions further includes periodically attempting to resolve the domain name, in which the domain name is unresolved; and disabling or blocking network traffic associated with the unresolved domain name while the domain name remains unresolved.

In some embodiments, dynamic resolution of FQDN address objects in policy definitions further includes reporting events based on network security threats, in which the reported events include one or more domain names associated with at least one of the network security threats.

In some embodiments, the various techniques described herein are extended to a centralized policy management as well as to a virtualized system (VSYS) deployment and environment. Accordingly, in some embodiments, dynamic resolution of IP addresses to FQDN address objects on a virtual system (VSYS) basis is provided. In some embodiments, dynamic resolution of FQDN address objects in policy definitions includes dynamically performing a first local Domain Name Server (DNS) lookup for a first virtual system (VSYS) using a first DNS server on a first domain name for implementing a first network policy based on the first domain name; dynamically performing a second local DNS lookup for a second VSYS using a second DNS server on the first domain name for implementing a second network policy based on the first domain name; in which the first network policy includes a network security rule that is based on the first domain name, and the second network policy includes a network security rule that is based on the second domain name.

In some embodiments, dynamic resolution of FQDN address objects in policy definitions further includes periodically updating the IP address information associated with the first domain based on a Time To Live (TTL) value, system frequency, a configuration setting, or an event; and periodically updating the IP address information associated with the second domain based on a Time To Live (TTL) value, system frequency, a configuration setting, or an event.

In some embodiments, dynamic resolution of FQDN address objects in policy definitions further includes executing a dynamic resolver on a security appliance, in which the dynamic resolver periodically resolves or updates one or more IP addresses associated with each domain name included in the network policy. In some embodiments, dynamic resolution of FQDN address objects in policy definitions further includes sending the resolved domain name information to a second security appliance, in which the first security appliance is an active security appliance, and in which the second security appliance is a passive security appliance that can be used for workload balancing or failover.

In some embodiments, dynamic resolution of FQDN address objects in policy definitions further includes reporting events based on network security threats, in which the reported events include one or more domain names and one or more VSYS associated with at least one of the network security threats.

FIG. 1 is a functional diagram for dynamic resolution of FQDN address objects in policy definitions in accordance with some embodiments. As shown in FIG. 1, network traffic is monitored at a firewall 100. In some embodiments, network traffic is monitored using a data appliance (e.g., a data appliance that includes security functions, such as a security appliance that includes a firewall). In some embodiments, network traffic is monitored using a gateway (e.g., a gateway that includes security functions, such as a security gateway). In some embodiments, network traffic is monitored using a host (e.g., security software executed on a host device, such as a network server or client computing device, such as a personal computer, laptop, tablet, or smart phone). In some embodiments, the network traffic is monitored using pass through (e.g., in line) monitoring techniques. In some embodiments, the network traffic is collected and/or monitored for events and/or reporting based on events (e.g., some of the network traffic can be monitored using pass through techniques and/or some of the network traffic can be collected and analyzed for monitoring the network traffic offline, such as in logs of network traffic) as further described herein with respect to various embodiments.

In some embodiments, network traffic is monitored using a state based firewall. In some embodiments, the state based firewall can monitor traffic flows using APP-ID engine (e.g., App Signature Check & User ID Check 108). For example, the monitored network traffic can include HTTP traffic, FTP traffic, DNS requests, unclassified application traffic (e.g., unknown application traffic), and/or other types of traffic (e.g., traffic using other types of known or unknown protocols).

As shown in FIG. 1, network traffic monitoring begins at 102. An IP address and port engine 104 determines an IP address and port number for a monitored traffic flow (e.g., a session) based on packet analysis. In some embodiments, user identification is then determined (e.g., user ID can be deduced based on the source IP address). A policy check engine 106 determines whether any policies can be applied based on the IP address and port number. As also shown in FIG. 1, an application signature check engine 108 identifies an application (e.g., using an APP ID engine using various application signatures for identifying applications based on packet flow analysis). For example, APP-ID engine 108 can be configured to determine what type of traffic the session involves, such as HTTP traffic, FTP traffic, DNS requests, unknown traffic, and various other types of traffic, and such classified traffic can be directed to an appropriate decoder, such as decoders 112, 114, and 116, to decode the classified traffic for each monitored session's traffic flow. If the monitored traffic is encrypted (e.g., encrypted using SSL, SSH, or another known encryption protocol), then the monitored traffic can be decrypted using a decrypt engine 110 (e.g., applying man in the middle techniques using a self-signed certificate). A known protocol decoder engine 112 decodes and analyzes traffic flows using known protocols (e.g., applying various signatures for the known protocol) and reports the monitored traffic analysis to a report and enforce policy engine 120. Identified traffic (no decoding required) engine 114 reports the identified traffic to the report and enforce policy engine 120. An unknown protocol decoder engine 116 decodes and analyzes traffic flows (e.g., applying various heuristics) and reports the monitored traffic analysis to the report and enforce policy engine 120.

In some embodiments, the results of the various traffic monitoring techniques using known protocol decoder engine 112, identified traffic engine 114, and unknown protocol decoder engine 116 described above are provided to report and enforce policies engine 120 (e.g., network/routing policies, security policies, and/or firewall policies). For example, firewall policies can be applied to the monitored network traffic using application identification, user identification, and/or other information to match signatures (e.g., file based, protocol based, and/or other types/forms of signatures for detecting malware or suspicious behavior).

In some embodiments, firewall 100 also includes a content-ID engine (not shown), and, in some embodiments, the content-ID engine's identified content is also used by report and enforce policy engine 120, possibly in various combinations with other information, such as application, user, and/or other information, to enforce various security/firewall policies/rules.

In some embodiments, policies are specified using FQDN address objects (e.g., domain names, such as www.google.com or www.yahoo.com, and/or host/server names, such as MailServer), which are dynamically resolved (e.g., at enforcement time and periodically updated/refreshed) to associated IP address(es) using various techniques as described herein with respect to various embodiments. Thus, policies can be specified using FQDN address objects and enforced using IP addresses along with other criteria, such as port, protocol, and/or other criteria/information. For example, a policy definition can be specified for security policy enforcement (e.g., firewall, vulnerability protection, anti-malware protection, intrusion prevention, and/or other types of security). A policy can also be specified for networking policy enforcement (e.g., policy based forwarding or routing, Quality of Service (QoS), and/or other types of networking policies). In some embodiments, a policy is a collection of rules (e.g., ordered rules). For example, a rule can be specified for ingress/inbound and/or egress/outbound parameters, such as IP address/range/subnet, port, protocol, and/or other characteristics of a network traffic flow. In addition to IP address, the rule can be specified by FQDN address object(s) of the source and/or destination entities. The actual IP addresses that will match the rule for policy enforcement can be independent of policy configuration. As another example, the firewall 100 can also monitor the DNS requests and the DNS responses from a client attempting to resolve names. The firewall can update a cache (e.g., FQDN-IP mapping 118) based on the monitored DNS responses, if the DNS responses are relevant for FQDN resolution of objects used in a policy (e.g., if the policy uses www.yahoo.com and a client browser accessed the www.yahoo.com web page, then the firewall can cache the DNS response from the DNS server for the DNS request from the browser).

As also shown in FIG. 1, a resolver 120 is provided to perform dynamic FQDN address objects resolution to IP addresses using various techniques described herein with respect to various embodiments. For example, resolver 120 can send a DNS query to a primary domain name server for a DNS lookup. As another example, one or more servers can be specified for DNS query information requests, in which the servers are used for name resolution if no specific context based server is configured as further described herein with respect to various embodiments. Resolver 120 sends the resolved IP address information to FQDN-IP mapping 118, which can store (e.g., cache or store based on storage limitations and/or other parameters or configuration settings) the FQDN address object and associated IP address(es), along with other information, such as TTL parameters/values or configured time-out parameters/values, and possibly VSYS information as discussed further below with respect to FIG. 3. The FQDN-IP mapping 118 is shown in communication with policy check 106 and report and enforce policy 120 (e.g., a policy enforcement engine), which can use this information for policy enforcement based on IP address information, in which the policy is specified by FQDN address objects.

In some embodiments, various other functional architectures and flows are provided to implement the policy enforcement using host information profile techniques described herein. For example, some of these functions can be implemented in software executed on a general processor and/or some of these functions can be implemented using hardware acceleration techniques for faster packet processing of network traffic.

Figure 2:
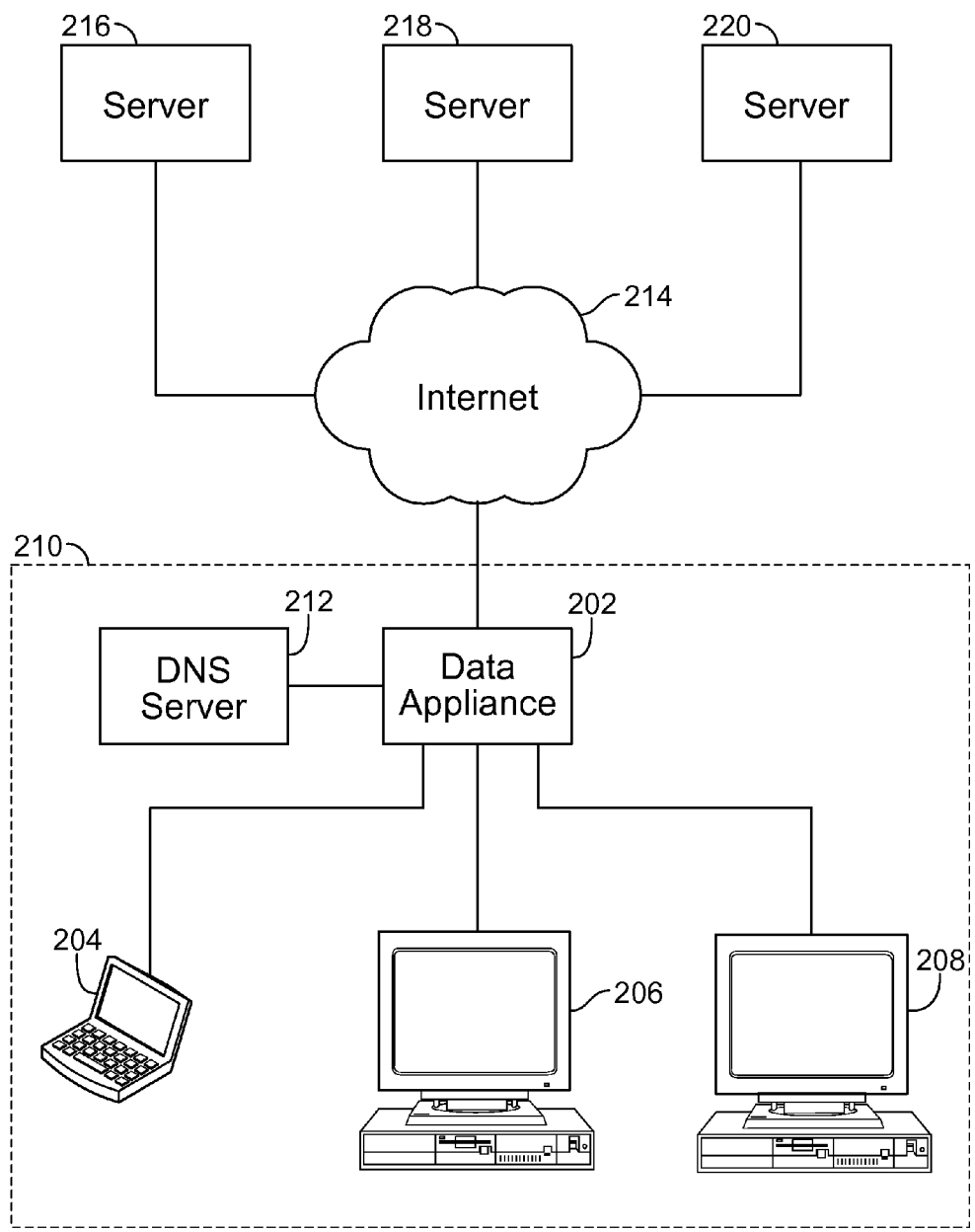
FIG. 2 is a block diagram of a network for dynamic resolution of FQDN address objects in policy definitions in accordance with some embodiments.

FIG. 2 is a block diagram of a network for dynamic resolution of FQDN address objects in policy definitions in accordance with some embodiments. As shown, a data appliance 202 is at the perimeter of a protected network 210, which includes clients 204, 206, and 208. Data appliance 202 can include a firewall function, such as firewall function 100 as described above, to protect the network and clients within the protected network 210, which is in communication with the Internet 214 and various servers, such as servers 216, 218, and 220 (e.g., web servers, mail servers, file servers, and/or other types of servers).

In some embodiments, data appliance 202 performs a dynamic resolution of FQDN address objects in policy definitions (e.g., at enforcement time or periodically updating to maintain a current/fresh IP address resolution for such domain names) using various techniques as described herein with respect to various embodiments. For example, data appliance 202 can send a DNS query to a primary DNS server 212 for a DNS lookup. Thus, policies can be specified using domain names and/or host/server names and enforced using IP addresses along with other criteria, such as port, protocol, and/or other criteria/information.

Figure 3:
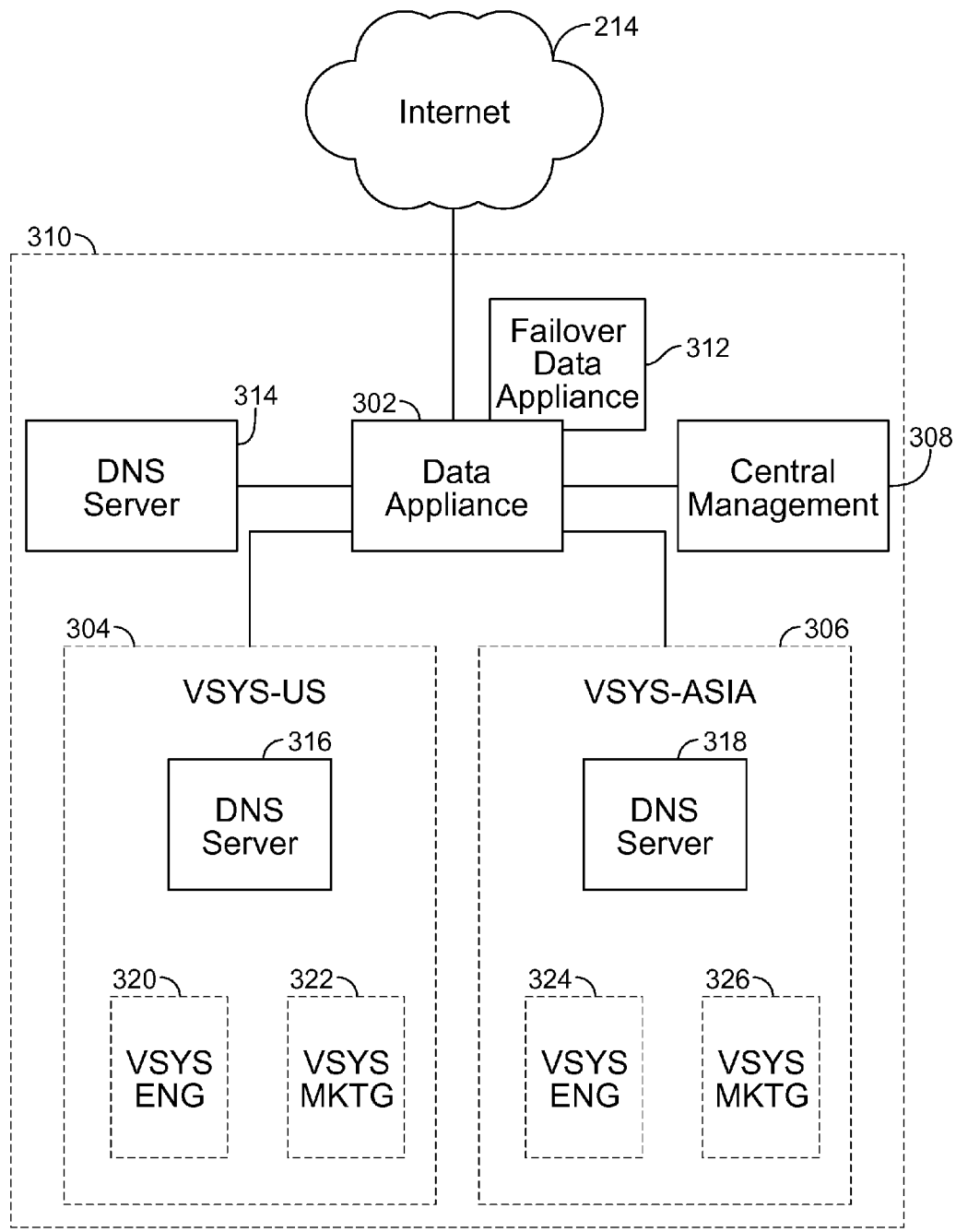
FIG. 3 is another block diagram of a network including virtual systems (VSYS) for dynamic resolution of FQDN address objects in policy definitions in accordance with some embodiments.

FIG. 3 is another block diagram of a network including virtual systems (VSYS) for dynamic resolution of FQDN address objects in policy definitions in accordance with some embodiments. As shown, a data appliance 302 is at the perimeter of a protected network 310, which includes virtual systems (VSYS) 304 (e.g., for the U.S. network for an enterprise) and VSYS 306 (e.g., for the Asia network for an enterprise). As shown, VSYS-US 304 includes VSYS ENG (e.g., for U.S. engineering) 320, and VSYS MKTG (e.g., for U.S. Marketing) 322, and VSYS-ASIA 306 includes VSYS ENG (e.g., for Asia engineering) 324, and VSYS MKTG (e.g., for Asia Marketing) 326. Data appliance 302 can include a firewall function, such as firewall function 100 as described above, to protect the network and clients within the protected network 310, which is in communication with the Internet 214 (e.g., and various servers, such as servers 216, 218, and 220, as similarly shown in FIG. 2). In some embodiments, a central DNS server/function can be provided and local DNS servers/functions can also be provided for each VSYS. As shown, a central DNS server 314 is provided for secured/protected network 310, and VSYS-US includes DNS server 316, and VSYS-ASIA 306 includes DNS server 318.

In some embodiments, data appliance 302 performs a dynamic resolution of FQDN address objects in policy definitions (e.g., at enforcement time or periodically updating for maintain a current/fresh IP address resolution for such domain names) using various techniques as described herein with respect to various embodiments. For example, data appliance 302 can send a DNS query to a primary or central DNS server 314 for a DNS lookup. For example, one or more central DNS servers can be used for domain name resolution if no specific context based domain name server is configured or available.

In some embodiments, a virtual system (VSYS) based DNS configuration can be used to provide a dynamic resolution of FQDN address objects in policy definitions. In some embodiments, data appliance 302 sends a DNS query to a local VSYS DNS server for a DNS lookup. For example, a DNS server 316 can be used for DNS queries for VSYS-US 304, and a DNS server 318 can be used for DNS queries for VSYS-US 306. In some embodiments, a priority ordered list of DNS services is specified for each instance of a virtual system (VSYS) configuration. For example, for any name resolution for traffic flowing through a virtual system, these domain name servers can be queried prior to falling back to system-wide, central domain name server specifications, such as DNS server 314. In some cases, the same domain name can resolve to different IP addresses based on VSYS or geography. For example, a host or domain name (e.g., www.google.com or www.yahoo.com) can resolve to different IP addresses based on whether the request is from a device based in the U.S. or based in Asia, as various web sites/web services provide geographically based web services to service local requests. As another example, a host name need not be fully specified, such as for a mail server, in which case the MailServer for VSYS ENG 320 will resolve to a different mail server host and IP address than the MailServer for VSYS ENG 324.

In some embodiments, a policy (e.g., a security policy and/or network policy) enforced by data appliance 302 is committed to be used by policy enforcer engine implemented by data appliance 302, all the FQDN based object entities are resolved to IP addresses. The address resolution component makes use of the most specific DNS server responses based on the context in which the FQDN is configured. For example, if the FQDN is configured for a virtual system and one or more DNS servers are specified for that virtual system, such as DNS server 316 for VSYS-US 304 and DNS server 318 for VSYS-ASIA 306, then the specific DNS servers are selected for resolving the FQDN entries. The name resolution component can cache the results as permitted by system memory availability for efficiency. In addition, any information regarding Time to Live (TTL) specified in a DNS response can be stored/cached with the IP address information, such that a fresh/update request can be made to DNS server to update the entry based on the TTL value/parameter. A periodic updater (e.g., the resolver function/component or another function/component) can check the status of each FQDN based entry used in each policy and re-fetch the resolved IP addresses before the TTL expires. The update frequency can also be based on a configured frequency in addition or in place of the TTL value/parameter. This periodic updater/resolver function/component can also serialize the name resolution results into non-volatile storage media to promptly recover from a local system and/or software failure. Another configuration element (e.g., policy enforcement function/component or another function/component) can specify the system behavior if the name resolution fails. For example, the action can be to disable the rule or to block traffic until a remedial action is performed (e.g., a change in policy definition configuration). The resolver component can continue to periodically attempt to resolve any unresolved names used in a policy at a configured frequency or a system defined frequency. A list of static DNS entries can also be configured for a virtual system or for the whole system.

In some embodiments, the policy enforcement engine uses an efficient data structure (e.g., a trie structure) to apply a policy lookup for source and destination IP address for incoming traffic flow to match a policy rule. In some embodiments, the policy enforcement engine receives updates from a dynamic resolver and adjusts the data structure accordingly. For example, the policy enforcement engine can apply the new structure to only new incoming traffic flows or it can also apply to existing flows as specified by system or configuration element.

In some embodiments, monitored network traffic events are recorded with source and destination IP address for the flow. For example, such events can also optionally include a virtual system (VSYS) identifier if applicable. When the events are reported in user interface or reports and charts, the IP addresses can also be resolved to a domain or host/server name if available (e.g., based on a name resolution query). The IP address can be resolved in the context of virtual system or the whole system as similarly discussed above. The resolver can also cache/store these results in memory for efficiency based on the TTL or configured time-out settings for freshness as applicable. These results can also be persisted for efficiency.

In some embodiments, multiple data appliances are provided and form a clustered system that can be deployed in active-active or active-passive configuration. As shown in FIG. 3, data appliance 302 is an active data appliance for protecting network 310, and data appliance 312 is a passive data appliance that can be used, for example, for failover purposes. In some embodiments, both data appliances 302 and 312 can be deployed as active data appliances and perform workload balancing for efficient data traffic monitoring and policy enforcement. In some embodiments, such as for efficiency, the name resolver function/component can be activated on a single system (e.g., active data appliance 302 in an active-passive configuration as shown, or one of the active data appliances in an active-active configuration). The FQDN name resolution and period updates are propagated by that data appliance executing the name resolver to other data appliances in the cluster to keep the information available locally and current/fresh on those other data appliances in the cluster. In some embodiments, multiple active devices (e.g., multiple data appliances) are provided in an active-active configuration for workload balancing, which can be implemented using a Virtual Routing Redundancy Protocol (VRRP) and/or other similar techniques.

In some embodiments, the central policy management, shown as central management 308, is provided for implementing consistent policies across multiple devices deployed in various locations. The rules in the policy can include FQDN entries to specify a client or a server. The same policy can also be applied to multiple devices (e.g., data appliance 302 and 312 serving various VSYS, such as VSYS 304 and VSYS 306) without any change. The actual resolution of names to IP addresses is postponed until the policy is applied/enforced on a device. On the device, the same technique noted above will be used to resolve names and their periodic updates. Using this approach, the same FQDN entry defined by central policy manager 308 can be interpreted appropriately by different devices based on their local configuration (e.g., as discussed above, a rule applied to the MailServer can be appropriately resolved based on the relevant VSYS). The central policy can also include different rules for different virtual systems (e.g., VSYS ENG can be blocked from accessing www.facebook.com, but VSYS MKTG can be allowed to access www.facebook.com).

In some embodiments, the traffic flow monitored by an active data appliance can generate events that are monitored and used for further analysis. For example, the events can be stored in memory and can also be stored in persistent storage if required. The traffic flow can include both the source and destination IP addresses. In some cases, it is also useful and convenient to report the resolved names for those IP addresses. The events generated by the devices can be forwarded to a central repository for storage and aggregation. For context sensitive resolution of IP addresses to names, the central management can distribute the queries to the reporting device for the event so that the device can perform context sensitive name resolution as discussed above. Based on the network topology, it can also be possible to centralize the name resolution on central management system itself. In some embodiments, the central management system/function 308 can activate the resolver function/component to locally look-up/query the device configuration to select the appropriate DNS server for the device or virtual system for the device.

Figure 4:
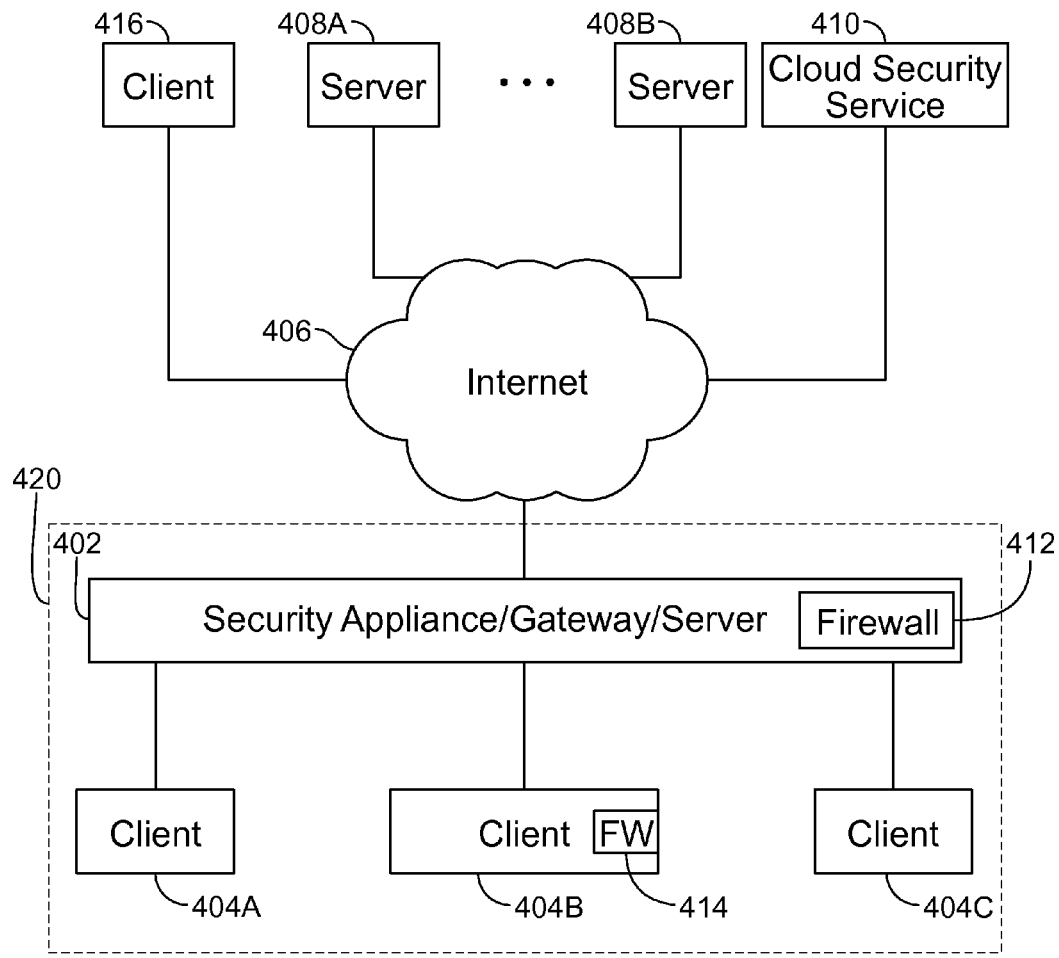
FIG. 4 is a block diagram illustrating an architecture for dynamic resolution of FQDN address objects in policy definitions in accordance with some embodiments.

FIG. 4 is a block diagram illustrating an architecture for dynamic resolution of FQDN address objects in policy definitions in accordance with some embodiments. As shown in FIG. 4, client devices 404A, 404B, and 404C are in communication with the Internet 406 via a security device 402. In some embodiments, the security device 402 includes a firewall 412 as shown. In some embodiments, one or more of the client devices 404A-404C includes a firewall 414 (e.g., host based firewall) as shown. In some embodiments, the security device 402 includes a data appliance (e.g., a security appliance), a gateway (e.g., a security server), a server (e.g., a server that executes security software including firewall 412), and/or some other security device, which, for example, can be implemented using computing hardware, software, or various combinations thereof. In some embodiments, firewall 412 and/or firewall 414 perform some or all of the functions described above with respect to FIG. 1. For example, client devices 404A-C can include various computing devices that can access the Internet via wired and/or wireless communications, such as computer, laptops, tablets, smart phones, and/or various other types of computing devices with network communication capabilities. As also shown, servers 408A-C are in communication with the Internet 406. For example, a client device can access a service provided by a server via the Internet, such as a web related service (e.g., web site, cloud based services, streaming services, or email service), peer-to-peer related service (e.g., file sharing), IRC service (e.g., chat service), and/or any other service that can be delivered via the Internet.

In some embodiments, dynamic resolution of FQDN address objects in policy definitions is implemented on or integrated into the security appliance/gateway/server 402 and/or firewall 414. In some embodiments, dynamic resolution of FQDN address objects in policy definitions is implemented on or integrated into and/or assisted by the security cloud service 410. For example, the security device 402 (e.g., an integrated security appliance/gateway/server) can communicate with security cloud service 410 (e.g., using secure communications, such as encrypted communication techniques) to receive security related content updates (e.g., signatures, heuristics, application ID related information, user ID related information, content ID related information, trusted/untrusted zone information, and/or policy/rules). As another example, the security device 402 (e.g., an integrated security appliance/gateway/server) can communicate with security cloud service 410 (e.g., using secure communications, such as encrypted communication techniques) to receive dynamic resolution/updates of FQDN address objects in policy definitions (e.g., for system wide IP address information, such as for remote web sites). As will now be apparent, some or all of the functions described above with respect to FIG. 1 can be assisted by or implemented in whole or in part by the security cloud service 410. The security cloud service 410 can, for example, reduce the processing on the client device (e.g., 404B) and/or security device 402.

Figure 5:
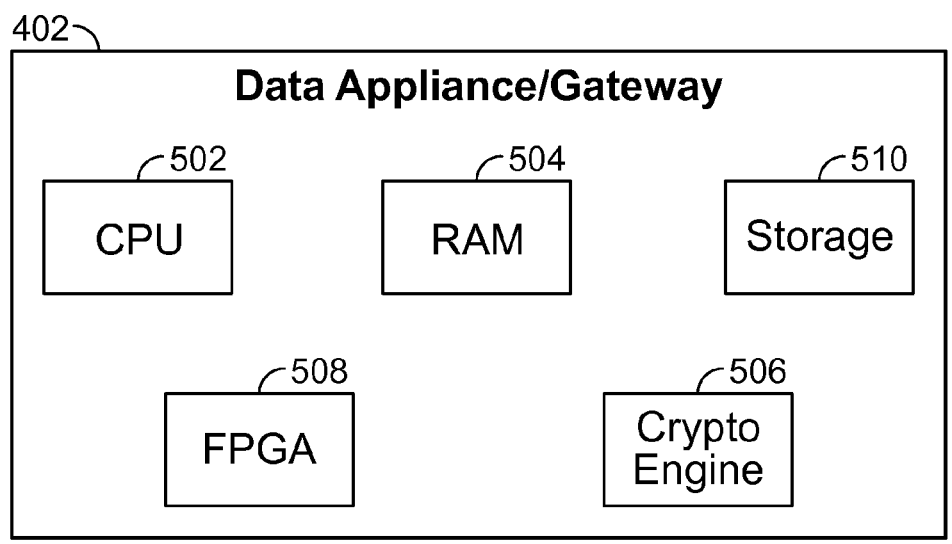
FIG. 5 is a functional diagram of hardware components of a data appliance for dynamic resolution of FQDN address objects in policy definitions in accordance with some embodiments.

FIG. 5 is a functional diagram of hardware components of a data appliance for dynamic resolution of FQDN address objects in policy definitions in accordance with some embodiments. The example shown is a representation of physical components that can be included in data appliance 402 (e.g., a data appliance or gateway). Specifically, data appliance 402 includes a high performance multi-core CPU 502 and RAM 504. Data appliance 402 also includes a storage 510 (e.g., one or more hard disks or solid state storage units), which is used to store policy and other configuration information as well as signatures. In some embodiments, storage 510 stores tables that include FQDN address objects and associated IP addresses and TTL parameters/values and possibly other information. In some cases, a domain or host/server name can have multiple associated IP addresses. Data appliance 402 can also include one or more optional hardware accelerators. For example, data appliance 402 can include a cryptographic engine 506 configured to perform encryption and decryption operations, and one or more FPGAs 508 configured to perform signature matching, act as network processors, and/or perform other tasks.

Figure 6:
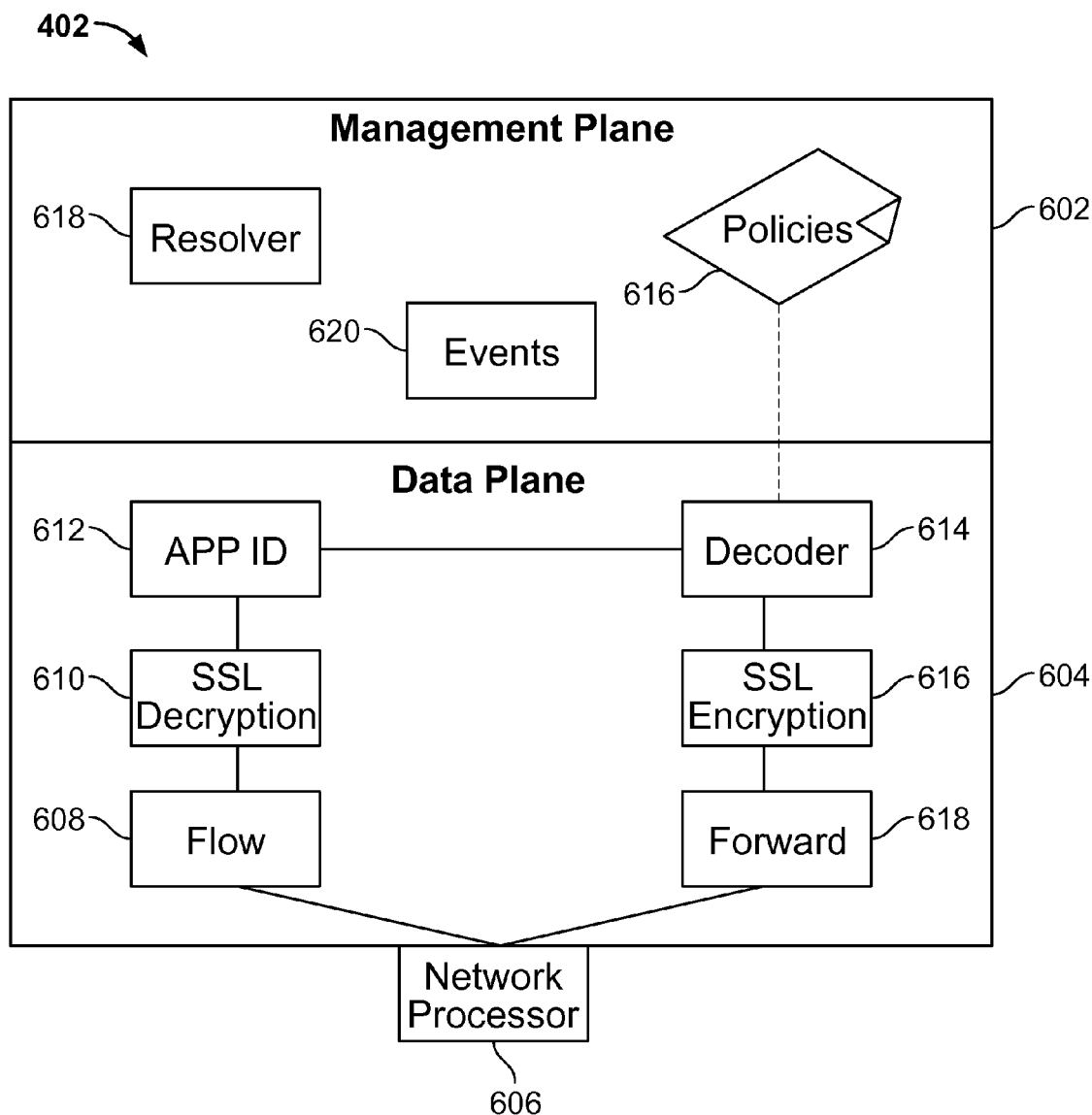
FIG. 6 is a functional diagram of logical components of a data appliance for dynamic resolution of FQDN address objects in policy definitions in accordance with some embodiments.

FIG. 6 is a functional diagram of logical components of a data appliance for dynamic resolution of FQDN address objects in policy definitions in accordance with some embodiments. The example shown is a representation of logical components that can be included in data appliance 402. As shown, data appliance 402 includes a management plane 602 and a data plane 604. In some embodiments, the management plane is responsible for managing user interactions, such as by providing a user interface for configuring policies and viewing log data. The data plane is responsible for managing data, such as by performing packet processing and session handling.

Suppose a client 404A attempts to access a server 408B using an encrypted session protocol, such as SSL. Network processor 606 is configured to receive packets from client 404A, and provide the packets to data plane 604 for processing. Flow 608 identifies the packets as being part of a new session and creates a new session flow. Subsequent packets will be identified as belonging to the session based on a flow lookup. If applicable, SSL decryption is applied by SSL decrypter 610. Otherwise, processing by SSL decrypter 610 is omitted. Application identification module 612 is configured to determine what type of traffic the session involves and to identify a user associated with the traffic flow. For example, application identification module 612 can recognize a GET request in the received data and conclude that the session requires an HTTP decoder. For each type of protocol, there exists a corresponding decoder 614. In some embodiments, the application identification is performed by an application identification module (e.g., APP-ID engine), and a user identification is performed by another function/engine. Based on the determination made by application identification module 612, the packets are sent to an appropriate decoder 614. Decoder 614 is configured to assemble packets (e.g., which may be received out of order) into the correct order, perform tokenization, and extract out information. Decoder 614 also performs signature matching to determine what should happen to the packet. As also shown, signatures 618 are received and stored in the management plane 602. In some embodiments, policy enforcement (e.g., policies can include one or more rules, which can be specified using domain and/or host/server names, and rules can apply one or more signatures or other matching criteria or heuristics) using signatures are applied as described herein with respect to various embodiments based on the monitored, identified, and decoded session traffic flows.

As also shown, resolver 618 is provided in the management plane 602 of the data appliance 402. In some embodiments, resolver 618 performs dynamic resolution of FQDN address objects (e.g., domain names, such as www.yahoo.com or www.google.com or any other domain name) and stores the IP address information associated with the FQDN address objects, in some cases, along with other information, such as TTL values/parameters, in the management plane 602. In some embodiments, resolver 618 performs dynamic resolution for FQDN address objects (e.g., domain and/or host/server names) specified in policies at policy enforcement time as described herein with respect to various embodiments. In some embodiments, resolver 618 periodically performs dynamic resolution updates for FQDN address objects (e.g., domain and/or host/server names) specified in policies at various other times based on configuration, system, events, TTL parameters/values, and/or other triggers/criteria, as described herein with respect to various embodiments. In some embodiments, policy enforcement (e.g., policies can include one or more rules, and rules can apply one or more signatures or other matching criteria or heuristics) using rules that specify one or more FQDN address objects (e.g., domain and/or host/server names) are applied as described herein with respect to various embodiments based on the monitored, identified, and decoded network traffic flows.

As also shown, management plane 602 of data appliance 402 includes events 620. In some embodiments, monitored network traffic events are recorded with source and destination IP address for the network traffic flow in events data store 620. In some embodiments, the event information is also stored with the FQDN address object(s) (e.g., domain and/or host/server name(s)) and the detected IP address information. In some embodiments, the event information is also stored with a virtual system (VSYS) identifier if the monitored network occurred on a particular VSYS of the network as applicable. In some embodiments, when the events are reported (e.g., presented in a user interface display output, log files, reports, and/or charts), the IP addresses are also resolved to a host name if available. In some embodiments, the resolver 618 sends a DNS query to a local, or remote, domain name resolution component/function. In some cases, the IP address can be resolved in the context of a virtual system (VSYS) or the whole system as described above. The resolver 618 can also cache/store these results in memory for efficiency while abiding by the TTL or configured timeout setting to maintain the freshness of the FQDN address objects and associated IP address information. In some cases, these results can also be persisted for efficiency.

Figure 7:
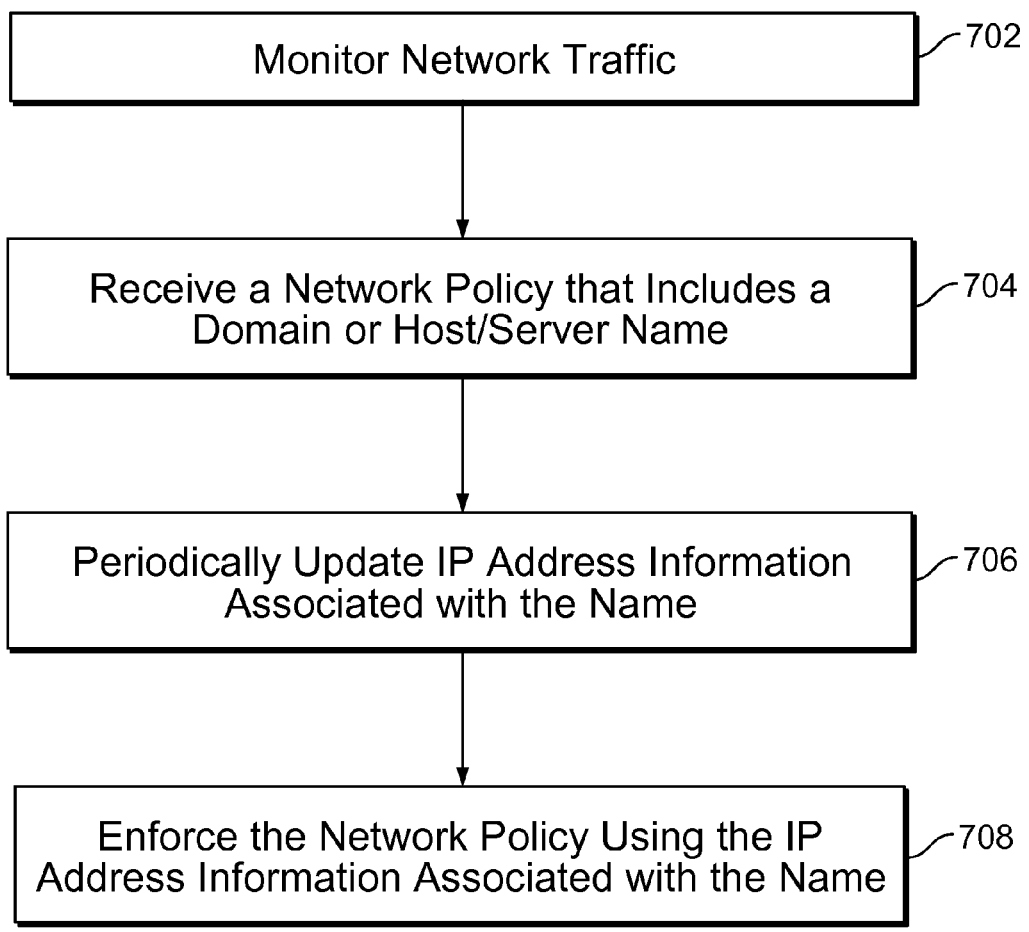
FIG. 7 is a flow diagram for dynamic resolution of FQDN address objects in policy definitions in accordance with some embodiments.

FIG. 7 is a flow diagram for dynamic resolution of FQDN address objects in policy definitions in accordance with some embodiments. At 702, network traffic is monitored (e.g., using firewall 100). At 704, a network policy that includes a domain or host/server name is received. At 706, IP address information associated with the name (e.g., domain or host/server name) is periodically updated. At 708, the network policy is enforced using the IP address information associated with the name (e.g., domain or host/server name).

Figure 8:
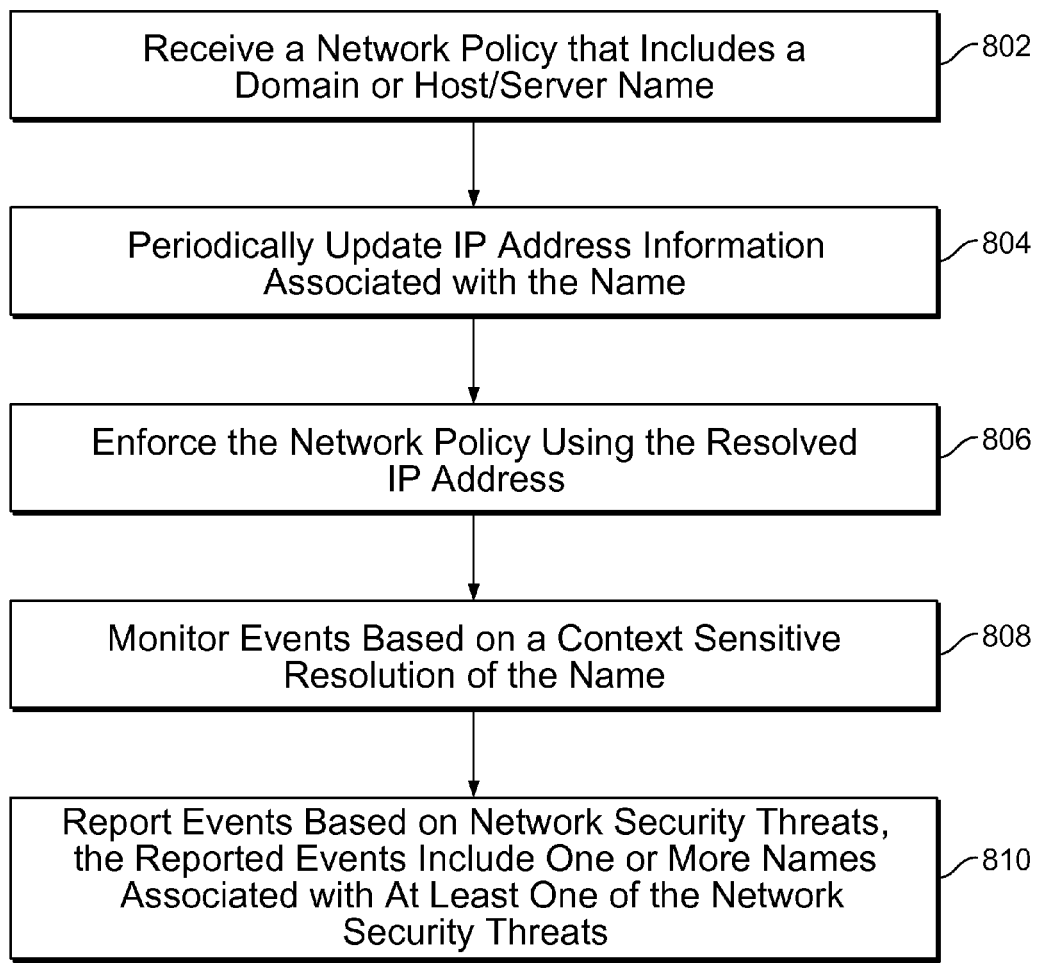
FIG. 8 is another flow diagram for dynamic resolution of FQDN address objects in policy definitions in accordance with some embodiments.

FIG. 8 is another flow diagram for dynamic resolution of FQDN address objects in policy definitions in accordance with some embodiments. At 802, a network policy that includes a domain or host/server name is received. At 804, IP address information associated with the name (e.g., domain or host/server name) is periodically updated. At 806, the network policy is enforced using the IP address information associated with the name (e.g., domain or host/server name). At 808, events based on a context sensitive resolution of the name are monitored. At 810, events based on network security threats are reported, in which the reported events include one or more names (e.g., domain or host/server names) associated with at least one of the network security threats.

Figure 9:
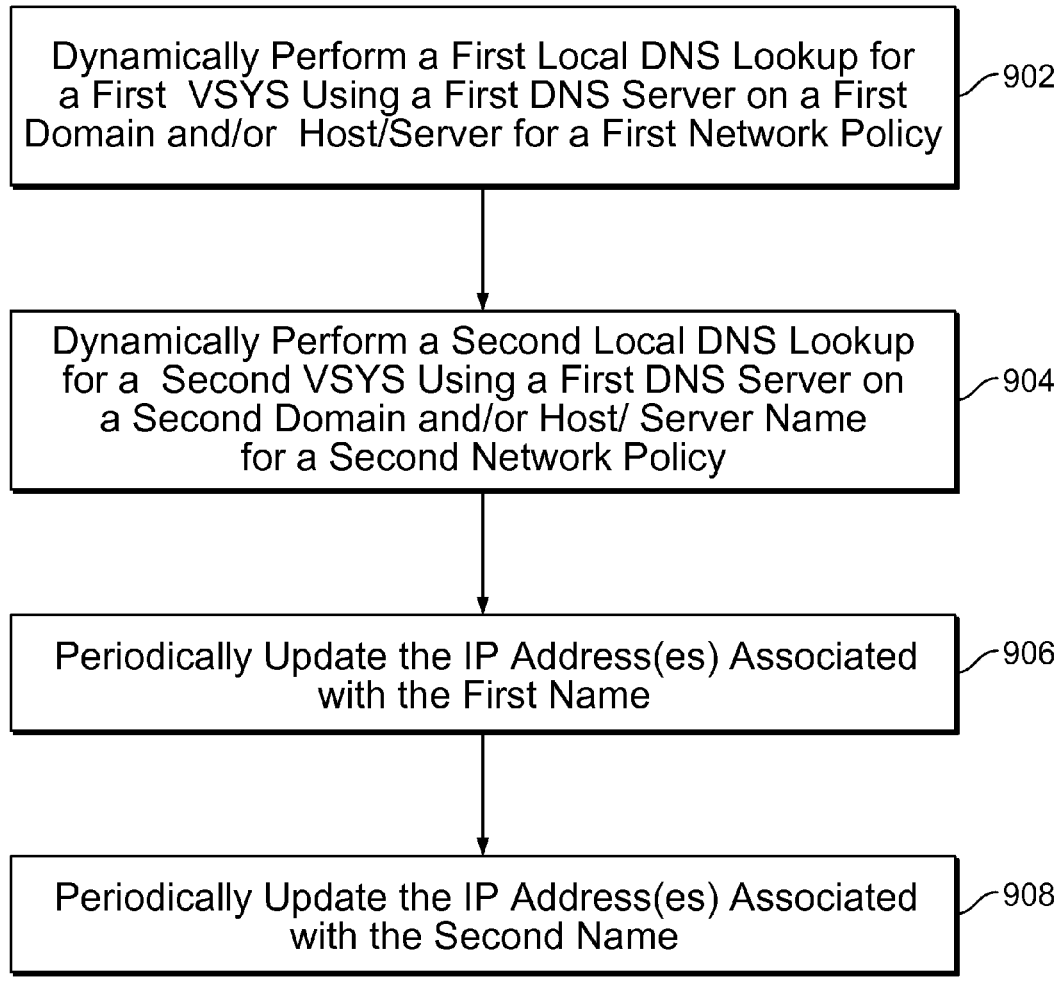
FIG. 9 is another flow diagram for dynamic resolution of FQDN address objects in policy definitions in accordance with some embodiments.

FIG. 9 is another flow diagram for dynamic resolution of FQDN address objects in policy definitions in accordance with some embodiments. At 902, a first local DNS lookup for a first VSYS using a first DNS server is dynamically performed on a first domain and/or host/server name for a first network policy. At 904, a second local DNS lookup for a second VSYS using a second DNS server is dynamically performed on a second domain and/or host/server name for a second network policy. At 906, IP address information associated with the first name (e.g., domain or host/server name) is periodically updated. At 908, IP address information associated with the second name (e.g., domain or host/server name) is periodically updated.

Figure 10:
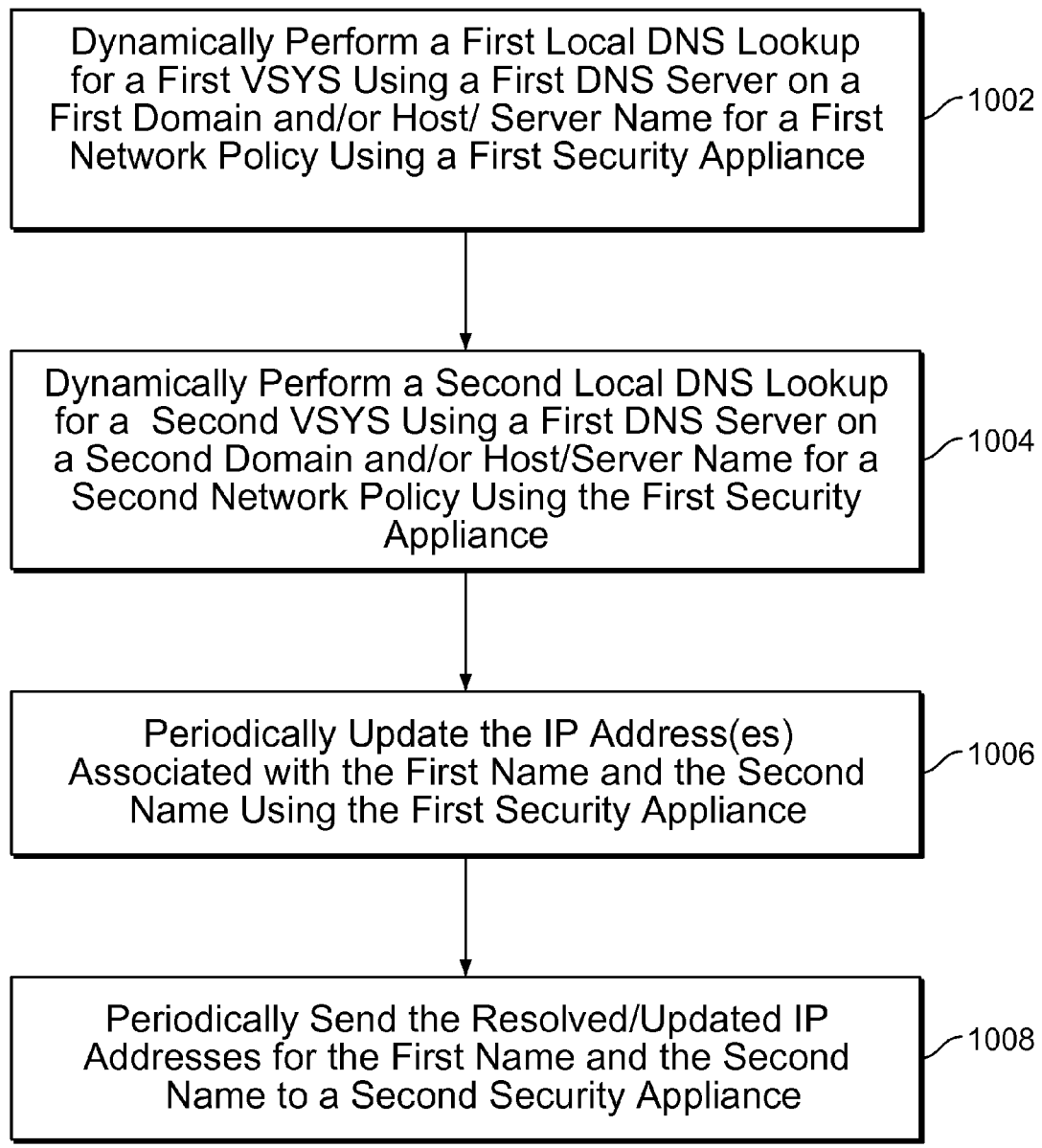
FIG. 10 is another flow diagram for dynamic resolution of FQDN address objects in policy definitions in accordance with some embodiments.

FIG. 10 is another flow diagram for dynamic resolution of FQDN address objects in policy definitions in accordance with some embodiments. At 1002, a first local DNS lookup for a first VSYS using a first DNS server is dynamically performed on a first domain and/or host/server name for a first network policy using a first security appliance. At 1004, a second local DNS lookup for a second VSYS using a second DNS server is dynamically performed on a second domain and/or host/server name for a second network policy using the first security appliance. At 1006, IP address information associated with the first name (e.g., domain or host/server name) and the second name (e.g., domain or host/server name) are periodically updated using the first security appliance. At 1008, the resolved/updated IP address information for the first name and the second name is periodically sent to a second security appliance. For example, the second security appliance can be an active security appliance or passive security appliance in a cluster (e.g., used for failover and/or workload balancing as discussed above).

As will now be apparent, various techniques for dynamic resolution of FQDN address objects in policy definitions techniques can be applied using the various embodiments described herein. Also, various system and network architectures can be applied using the various techniques described herein. For example, various techniques for dynamic resolution of FQDN address objects in policy definitions as described herein can be implemented in an integrated security appliance that provides inline filtering functionality and also executes the dynamic resolution of FQDN address objects in policy definitions techniques as described herein. As another example, the dynamic resolution of FQDN address objects in policy definitions functionality can be implemented using another appliance or computer server, which can communicate to various other security functions (e.g., security appliances, network appliances, and/or host based security software). As yet another example, the dynamic resolution of FQDN address objects in policy definitions functionality can be implemented using or assisted by a security cloud service, which can communicate to various other security functions (e.g., security appliances, network appliances, and/or host based security software) and/or generates new security updates (e.g., pushes the new signature(s) to various security devices/software that subscribe to signature updates from the security cloud service vendor).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
 receive a network policy that includes a domain name, wherein the domain name includes a Fully Qualified Domain Name (FQDN);
 periodically update Internet Protocol (IP) address information associated with the domain name by performing a Domain Name Server (DNS) query, wherein update the IP address information comprises:
 determine whether the domain name has been resolved;
 in the event that the domain name has not been resolved, attempt to resolve the domain name; and
 in the event that the domain name has been resolved, check whether the IP address information associated with the domain name has changed; and
 in the event that the network policy is to be enforced and the IP address information associated with the domain name has not been updated, dynamically perform a resolution of the domain name to enforce the network policy based on the domain name; and
a memory coupled to the processor and configured to provide the processor with instructions.

2. The system recited in claim 1, wherein the system includes a security appliance, and wherein the security appliance includes a firewall.

3. The system recited in claim 1, wherein the IP address information includes Internet Protocol Version 4 (IPv4) information or Internet Protocol Version 6 (IPv6) information.

4. The system recited in claim 1, wherein the IP address information is periodically updated based on a Time To Live (TTL) value.

5. The system recited in claim 1, wherein the IP address information is periodically updated based on a system frequency.

6. The system recited in claim 1, wherein the IP address information is periodically updated based on a configuration setting.

7. The system recited in claim 1, wherein the IP address information is periodically updated based on an event.

8. The system recited in claim 1, wherein the network policy includes a network security rule that is based on the domain name.

9. The system recited in claim 1, wherein the network policy includes a network security rule that is based on the domain name, and wherein the network policy includes one or more of the following rules based on the domain name: a routing rule, a Quality of Service (QoS) rule, and a workload balancing rule.

10. The system recited in claim 1, wherein the domain name only includes a subset of the FQDN, and the policy includes a host name that is not specified as the FQDN.

11. The system recited in claim 1, wherein update the IP address information further comprises:
execute a dynamic resolver, wherein the dynamic resolver performs the periodically update the IP address information associated with the domain name.

12. The system recited in claim 1, wherein the processor is further configured to:
dynamically perform a resolution of the domain name using a central management system for implementing the network policy based on the domain name, wherein the domain name was not necessarily resolved or updated prior to enforcing the network policy.

13. The system recited in claim 1, wherein the processor is further configured to:
enforce the network policy based on the IP address, wherein the IP address is associated with the domain name, and the policy includes a rule or action based on the domain name.

14. The system recited in claim 1, wherein the processor is further configured to:
enforce the network policy based on the IP address, wherein the IP address is associated with the domain name, and the policy includes a rule or action based on the domain name; and
monitor events based on a context sensitive resolution of the domain name.

15. The system recited in claim 1, wherein the processor is further configured to:
store the domain name, the IP address information associated with the domain name, and a Time To Live (TTL) value for the IP address information associated with the domain name.

16. The system recited in claim 1, wherein the processor is further configured to:
store the domain name, a plurality of IP addresses associated with the domain name, and a Time To Live (TTL) value for each of the plurality of IP addresses associated with the domain name in a data store including one or more tables.

17. The system recited in claim 1, wherein the processor is further configured to:
report events based on network security threats, wherein the reported events include one or more domain names associated with at least one of the network security threats.

18. A method, comprising:
receiving a network policy that includes a domain name, wherein the domain name includes a Fully Qualified Domain Name (FQDN);
periodically updating Internet Protocol (IP) address information associated with the domain name by performing a Domain Name Server (DNS) query, wherein periodically updating the IP address information comprises:
determining whether the domain name has been resolved;
in the event that the domain name has not been resolved, attempting to resolve the domain name; and
in the event that the domain name has been resolved, checking whether the IP address information associated with the domain name has changed; and
in the event that the network policy is to be enforced and the IP address information associated with the domain name has not been updated, dynamically performing a resolution of the domain name to enforce the network policy based on the domain name.

19. A computer program product, the computer program product being embodied in a non-transitory computer readable storage medium and comprising computer instructions for:
receiving a network policy that includes a domain name, wherein the domain name includes a Fully Qualified Domain Name (FQDN);
periodically updating Internet Protocol (IP) address information associated with the domain name by performing a Domain Name Server (DNS) query, wherein periodically updating the IP address information comprises:
determining whether the domain name has been resolved;
in the event that the domain name has not been resolved, attempting to resolve the domain name; and
in the event that the domain name has been resolved, checking whether the IP address information associated with the domain name has changed; and
in the event that the network policy is to be enforced and the IP address information associated with the domain name has not been updated, dynamically performing a resolution of the domain name to enforce the network policy based on the domain name.

20. The method of claim 18, wherein the IP address information includes Internet Protocol Version 4 (IPv4) information or Internet Protocol Version 6 (IPv6) information.

21. The method of claim 18, wherein the IP address information is periodically updated based on a Time To Live (TTL) value.

22. The method of claim 18, wherein the IP address information is periodically updated based on a system frequency.

23. The method of claim 18, wherein the IP address information is periodically updated based on a configuration setting.

24. The method of claim 18, wherein the IP address information is periodically updated based on an event.

25. The method of claim 18, wherein the network policy includes a network security rule that is based on the domain name.

26. The method of claim 18, wherein the network policy includes a network security rule that is based on the domain name, and wherein the network policy includes one or more of the following rules based on the domain name: a routing rule, a Quality of Service (QoS) rule, and a workload balancing rule.

27. The method of claim 18, wherein the domain name only includes a subset of the FQDN, and the policy includes a host name that is not specified as the FQDN.

28. The method of claim 18, further comprising:
dynamically performing a resolution of the domain name using a central management system for implementing the network policy based on the domain name, wherein the domain name was not necessarily resolved or updated prior to enforcing the network policy.

29. The method of claim 18, further comprising:
enforcing the network policy based on the IP address, wherein the IP address is associated with the domain name, and the policy includes a rule or action based on the domain name.

30. The method of claim 18, further comprising:
enforcing the network policy based on the IP address, wherein the IP address is associated with the domain name, and the policy includes a rule or action based on the domain name; and
monitoring events based on a context sensitive resolution of the domain name.

31. The method of claim 18, further comprising:
reporting events based on network security threats, wherein the reported events include one or more domain names associated with at least one of the network security threats.

* * * * *